(12) United States Patent
Huang

(10) Patent No.: US 7,857,286 B1
(45) Date of Patent: Dec. 28, 2010

(54) FAUCET HAVING LEAKPROOF EFFECT

(76) Inventor: Li-Chen Huang, 594, Sec. 3, Lu Ho Rd., Lu Kang Chen, Changhua Hsien (TW)

( * ) Notice: Subject to any disclaimer, the term of this patent is extended or adjusted under 35 U.S.C. 154(b) by 436 days.

(21) Appl. No.: 12/045,871

(22) Filed: Mar. 11, 2008

(51) Int. Cl.
*F16K 1/12* (2006.01)
(52) U.S. Cl. ............ 251/322; 251/323; 277/549; 4/678; 137/119.05; 137/801
(58) Field of Classification Search ............ 137/119.03, 137/119.05, 119.08, 801; 251/322, 323; 277/549; 4/678
See application file for complete search history.

(56) References Cited

U.S. PATENT DOCUMENTS

| | | | |
|---|---|---|---|
| 1,666,531 A * | 4/1928 | Glauber | ............ 4/570 |
| 2,046,474 A * | 7/1936 | Maggenti | ............ 137/588 |
| 3,336,913 A * | 8/1967 | McCormick | ............ 123/188.6 |
| 3,779,278 A * | 12/1973 | Hill | ............ 137/597 |
| 7,258,322 B1 * | 8/2007 | Yang | ............ 251/323 |

* cited by examiner

*Primary Examiner*—Stephen Hepperle
*Assistant Examiner*—William McCalister
(74) *Attorney, Agent, or Firm*—Alan Kamrath; Kamrath & Associates PA

(57) ABSTRACT

A faucet includes a faucet body, a sleeve, a control valve, and a mounting seat. The control valve includes a control shaft, a stop gasket, a retaining member, a leakproof gasket, a sealing gasket, a first leakproof cap, a second leakproof cap, a control knob, and a restoring member. Thus, the sealing gasket, the leakproof gasket, the first leakproof cap and the second leakproof cap of the control valve are tightly and closely located between the control shaft and the through hole of the faucet body to seal the through hole so as to prevent the water from leaking from the through hole and to stabilize the water pressure in the faucet body.

17 Claims, 7 Drawing Sheets

FAUCET HAVING LEAKPROOF EFFECT

BACKGROUND OF THE INVENTION

1. Field of the Invention

The present invention relates to a faucet and, more particularly, to a faucet that is connected to a shower head.

2. Description of the Related Art

A conventional faucet comprises a faucet body, a sleeve, and a control valve. The faucet body has a first end provided with a through hole and a water outlet port. The sleeve is mounted in a second end of the faucet body and has a first end provided with a flow channel connected to the through hole and the water outlet port of the faucet body and a second end provided with a receiving chamber connected to the flow channel. The control valve is mounted in the faucet body and the sleeve and includes a control shaft movably mounted in the faucet body and the sleeve and having a first end extending through the through hole of the faucet body and a second end extending into the receiving chamber of the sleeve, a stop member secured on the second end of the control shaft to move with the control shaft and movable to seal the flow channel of the sleeve to interrupt a connection between the flow channel of the sleeve and the receiving chamber of the sleeve, an O-ring mounted between the first end of the control shaft and the through hole of the faucet body, and a control knob mounted on the first end of the control shaft and located outside of the faucet body to move the control shaft and the stop gasket.

In operation, the stop gasket of the control valve is initially detached from the flow channel of the sleeve to connect the flow channel of the sleeve to the receiving chamber of the sleeve. In such a manner, the water from a water pipe in turn flows through a first water inlet, the receiving chamber of the sleeve, the flow channel of the sleeve and the water outlet port of the faucet body and flows outwardly from the water outlet port of the faucet body for use with a user. On the contrary, when the control knob of the control valve is pulled outwardly relative to the faucet body, the control shaft of the control valve is movable relative to the faucet body and the sleeve to move the stop gasket of the control valve to seal the flow channel of the sleeve so as to interrupt the connection between the flow channel of the sleeve and the receiving chamber of the sleeve, so that the water from the water pipe flows through a second water inlet to a shower head of the faucet body and flows outwardly from the shower head of the faucet body for use with the user.

However, the O-ring between the first end of the control shaft and the through hole of the faucet body cannot seal the through hole of the faucet body efficiently, so that the water easily leaks outwardly from the through hole of the faucet body, thereby causing inconvenience to the user when operating the faucet.

BRIEF SUMMARY OF THE INVENTION

In accordance with the present invention, there is provided a faucet, comprising a faucet body, a sleeve, and a control valve. The faucet body has a first end provided with a through hole and a water outlet port. The sleeve is mounted in a second end of the faucet body and has a first end provided with a flow channel connected to the through hole and the water outlet port of the faucet body and a second end provided with a receiving chamber connected to the flow channel. The control valve is mounted in the faucet body and the sleeve and includes a control shaft movably mounted in the faucet body and the sleeve and having a first end extending through the through hole of the faucet body and a second end extending into the receiving chamber of the sleeve, a stop gasket secured on the second end of the control shaft to move with the control shaft and movable to seal the flow channel of the sleeve to interrupt a connection between the flow channel of the sleeve and the receiving chamber of the sleeve, a leakproof gasket secured in the through hole of the faucet body and encompassing the control shaft, and a sealing gasket secured on the first end of the control shaft and located in the leakproof gasket.

The primary objective of the present invention is to provide a faucet having a leakproof effect.

Another objective of the present invention is to provide a faucet, wherein the sealing gasket, the leakproof gasket, the first leakproof cap and the second leakproof cap of the control valve are tightly and closely located between the control shaft of the control valve and the through hole of the faucet body to seal the through hole of the faucet body so as to prevent the water from leaking from the through hole of the faucet body and to stabilize the water pressure in the faucet body.

A further objective of the present invention is to provide a faucet, wherein when the water flow stops, the stop gasket of the control valve is pushed by the restoring force of the restoring member of the control valve to detach from the flow channel of the sleeve to connect the flow channel of the sleeve to the receiving chamber of the sleeve so that the water flows outwardly from the water outlet port of the faucet body at a normal state, thereby facilitating the user operating the faucet.

A further objective of the present invention is to provide a faucet, wherein the control knob of the control valve is pushed by the restoring force of the restoring member of the control valve to return to the original state, thereby saving the user's energy.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
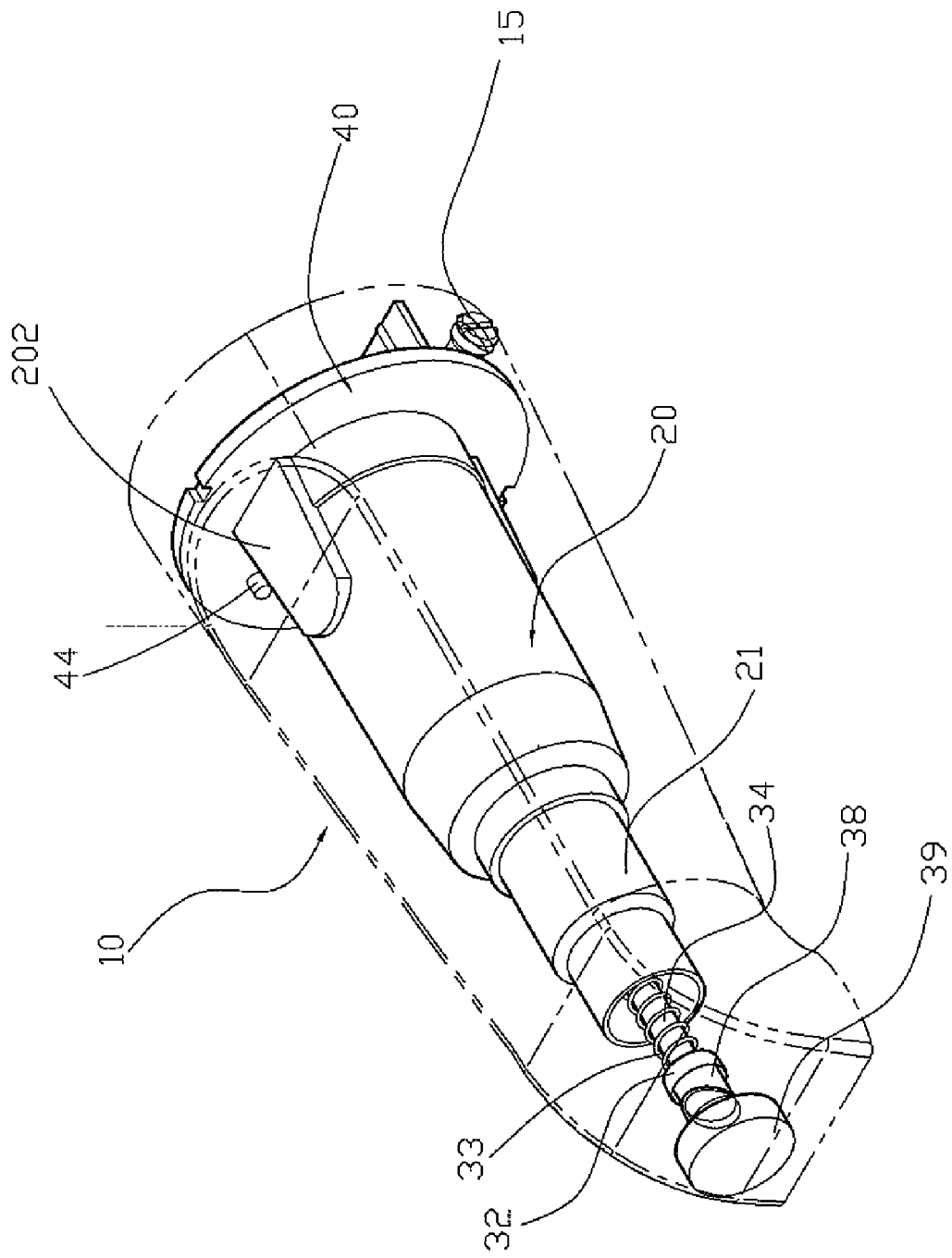
FIG. 1 is a perspective view of a faucet in accordance with the preferred embodiment of the present invention.
Figure 2:
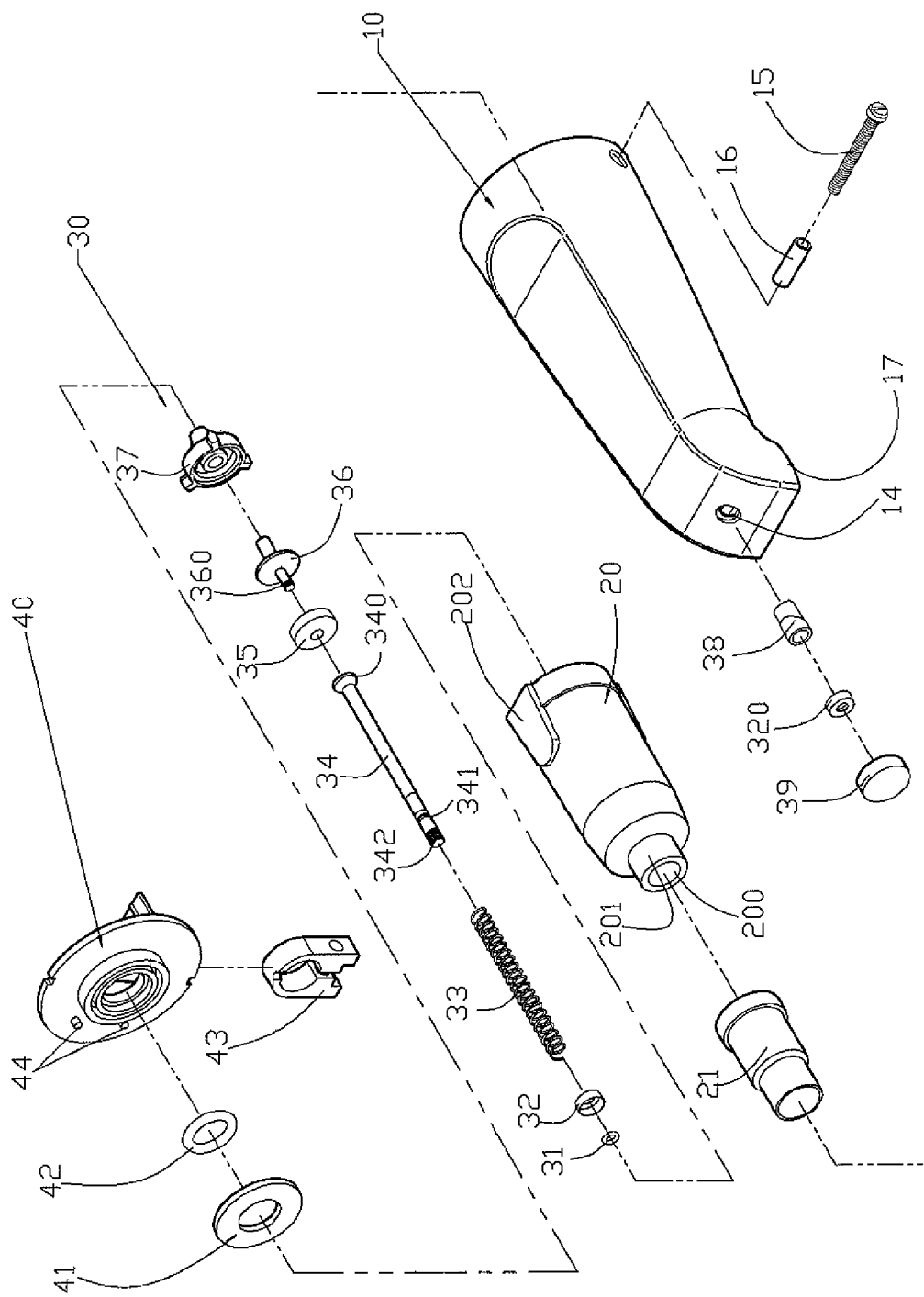
FIG. 2 is an exploded perspective view of the faucet as shown in FIG. 1.
Figure 3:
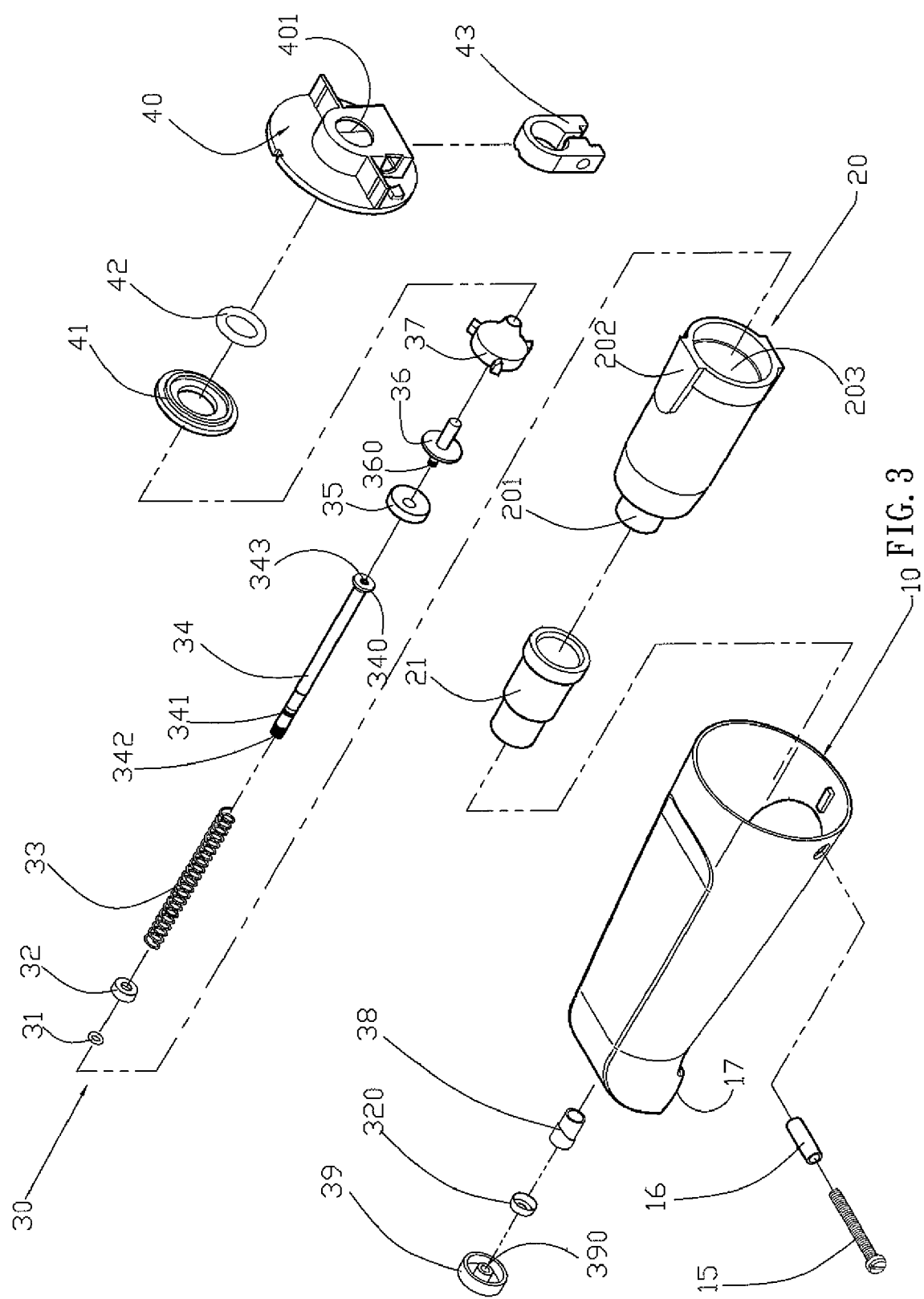
FIG. 3 is an exploded perspective view of the faucet as shown in FIG. 1.

Referring to the drawings and initially to FIGS. 1-5, a faucet in accordance with the preferred embodiment of the present invention comprises a faucet body 10, a sleeve 20, a control valve 30, and a mounting seat 40.

The faucet body 10 has a first end provided with a through hole 14 and a water outlet port 17.

The sleeve 20 is mounted in a second end of the faucet body 10 and has a first end provided with a flow channel 200 connected to the through hole 14 and the water outlet port 17 of the faucet body 10 and a second end provided with a receiving chamber 203 connected to the flow channel 200. The first end of the sleeve 20 is provided with a protruding mounting post 201. The second end of the sleeve 20 has a periphery provided with two radially opposite protruding limit edges 202. An extension sleeve 21 is mounted in the faucet body 10 and has a first end mounted on the mounting post 201 of the sleeve 20 and a second end connected to the through hole 14 and the water outlet port 17 of the faucet body 10.

The control valve 30 is mounted in the faucet body 10 and the sleeve 20 and includes a control shaft 34 movably mounted in the faucet body 10 and the sleeve 20 and having a first end extending through the through hole 14 of the faucet body 10 and a second end extending into the receiving chamber 203 of the sleeve 20, a stop gasket 35 secured on the second end of the control shaft 34 to move with the control shaft 34 and movable to seal the flow channel 200 of the sleeve 20 to interrupt a connection between the flow channel 200 of the sleeve 20 and the receiving chamber 203 of the sleeve 20, a retaining member 36 combined with the second end of the control shaft 34 and abutting the stop gasket 35 to retain the stop gasket 35 on the control shaft 34, a valve seat 37 mounted on the retaining member 36 to move with the retaining member 36, a leakproof gasket 38 secured in the through hole 14 of the faucet body 10 and encompassing the control shaft 34, a sealing gasket 31 secured on the first end of the control shaft 34 and located in the leakproof gasket 38, a first leakproof cap 32 mounted between the leakproof gasket 38 and the control shaft 34 and located in the faucet body 10, a second leakproof cap 320 mounted between the leakproof gasket 38 and the control shaft 34 and located outside of the faucet body 10, a control knob 39 mounted on the first end of the control shaft 34 and located outside of the faucet body 10 to move the control shaft 34 and the stop gasket 35, and a restoring member 33 mounted on the control shaft 34 and biased between the faucet body 10 and the stop gasket 35 to move the stop gasket 35 to detach from the flow channel 200 of the sleeve 20 to connect the flow channel 200 of the sleeve 20 to the receiving chamber 203 of the sleeve 20.

The leakproof gasket 38 of the control valve 30 is located between the first leakproof cap 32 and the second leakproof cap 320.

The first leakproof cap 32 of the control valve 30 is enclosed around a first end face of the leakproof gasket 38 and abuts a periphery of the control shaft 34, and the second leakproof cap 320 is enclosed around a second end face of the leakproof gasket 38 and abuts the periphery of the control shaft 34.

The control shaft 34 of the control valve 30 extends through the extension sleeve 21 and the flow channel 200 of the sleeve 20. The first end of the control shaft 34 of the control valve 30 is movable in the leakproof gasket 38 and is provided with a retaining groove 341 and an outer thread 342. The second end of the control shaft 34 of the control valve 30 has an outer wall provided with an enlarged stop flange 340 and an inner wall provided with an inner thread 343.

The sealing gasket 31 of the control valve 30 is movable in the leakproof gasket 38 and is secured in the retaining groove 341 of the control shaft 34.

The control knob 39 of the control valve 30 is provided with an inner thread 390 screwed onto the outer thread 342 of the control shaft 34.

The restoring member 33 of the control valve 30 is a spring which is biased between the first leakproof cap 32 and the stop flange 340 of the control shaft 34.

The retaining member 36 of the control valve 30 is provided with a threaded rod 360 extending through the stop gasket 35 and screwed into the inner thread 343 of the control shaft 34.

The stop gasket 35 of the control valve 30 is made of rubber and has a ring shape.

The mounting seat 40 is mounted on the second end of the faucet body 10 and combined with the second end of the sleeve 20 by a high frequency wave technology to seal the faucet body 10 and the sleeve 20. The mounting seat 40 has an inside provided with a water inlet port 401 connected to the receiving chamber 203 of the sleeve 20. The mounting seat 40 has a periphery provided with two spaced limit stubs 44 abutting the limit edges 202 of the sleeve 20. The mounting seat 40 has a side provided with a washer 41 and an O-ring 42 located between the sleeve 20 and the mounting seat 40. A substantially U-shaped snapping member 43 is mounted on a periphery of the second end of the faucet body 10 by a metallic bushing 16 and a locking bolt 15 and extends into the mounting seat 40 for mounting a water pipe 50 which has a first water inlet 52 connected to the water inlet port 401 of the mounting seat 40 and a second water inlet 54 connected to a shower head (not shown).

Figure 4:
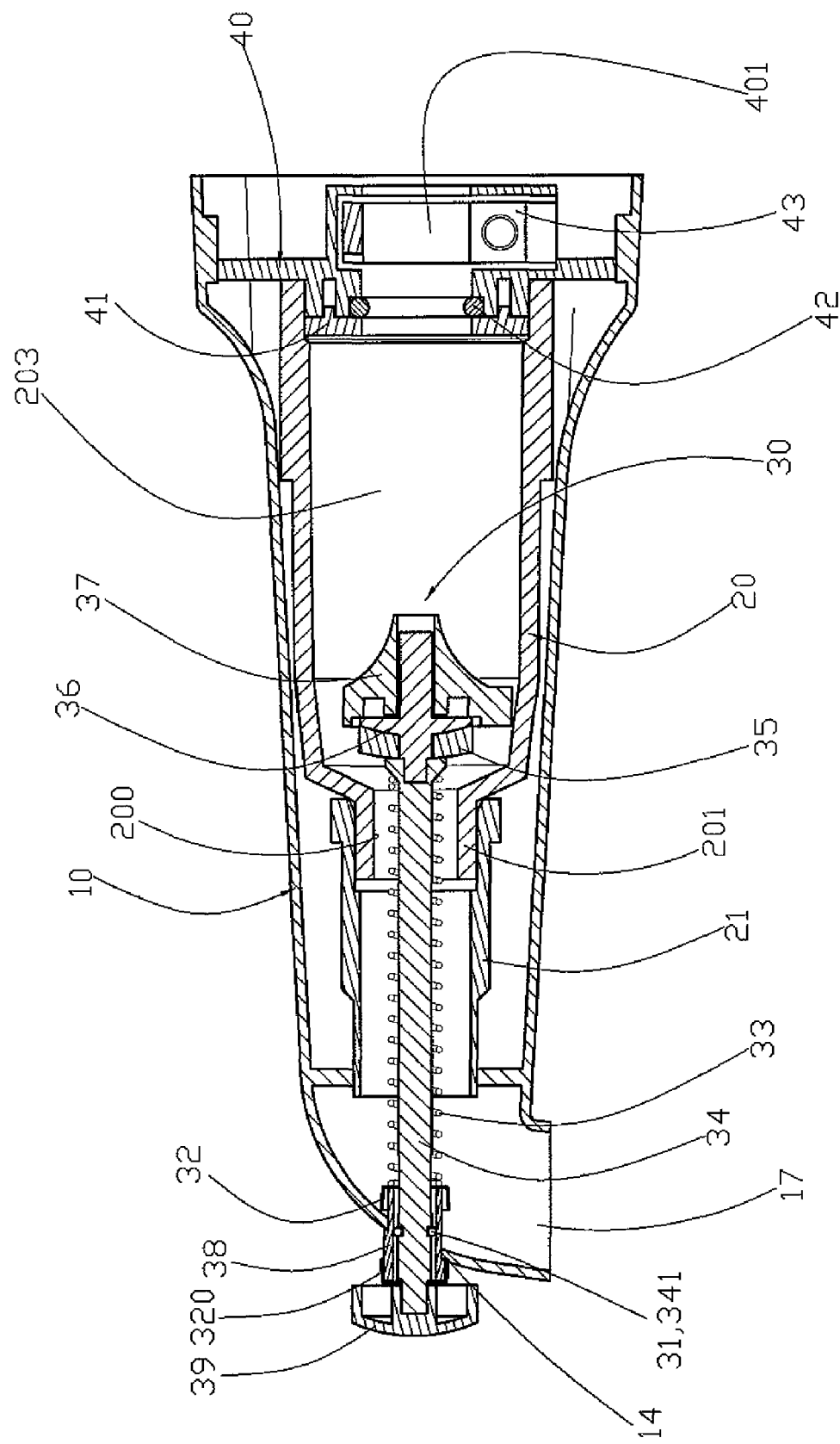
FIG. 4 is a front cross-sectional view of the faucet as shown in FIG. 1.
Figure 5:
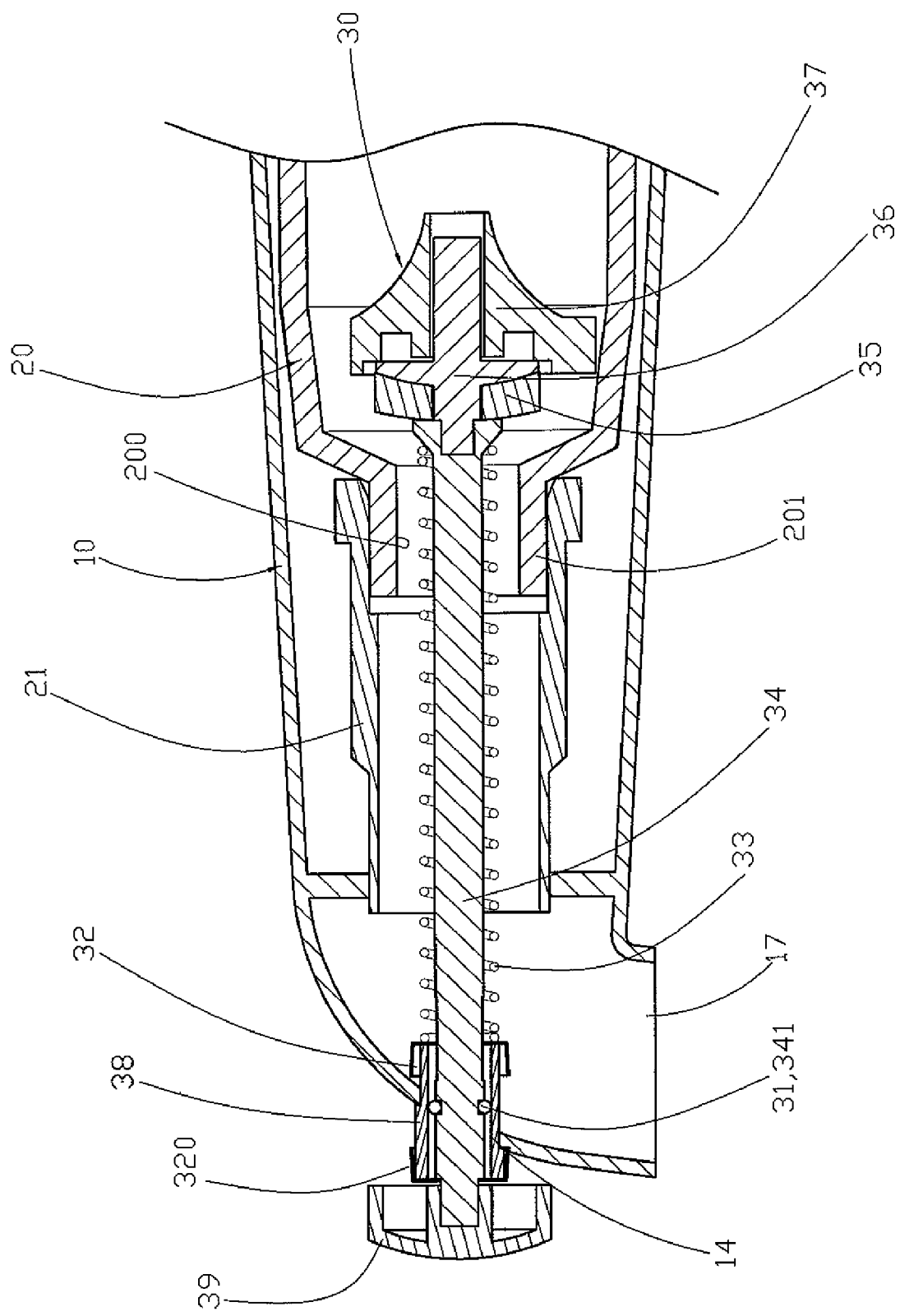
FIG. 5 is a locally enlarged view of the faucet as shown in FIG. 4.
Figure 6:
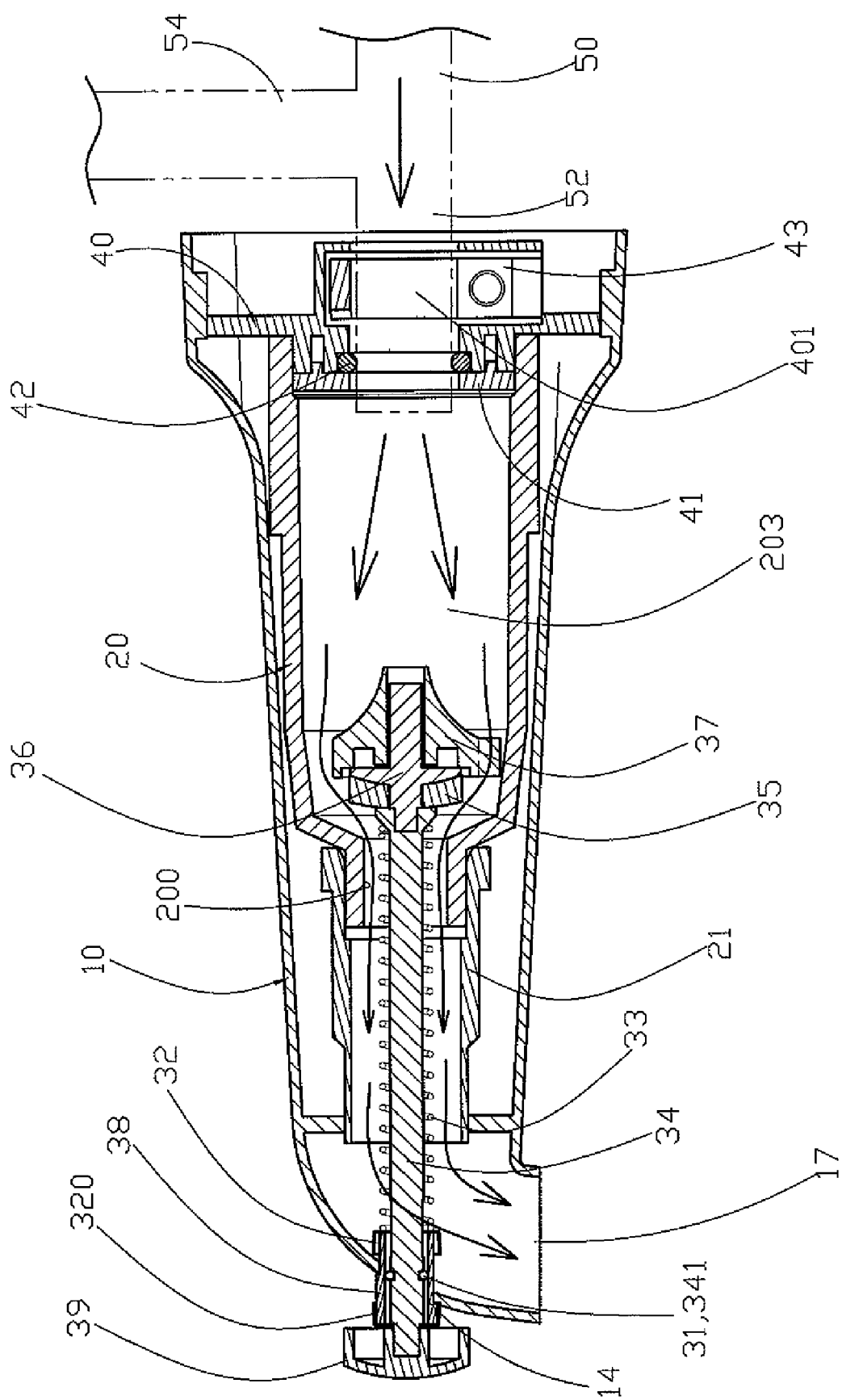
FIG. 6 is a schematic operational view of the faucet as shown in FIG. 4.
Figure 7:
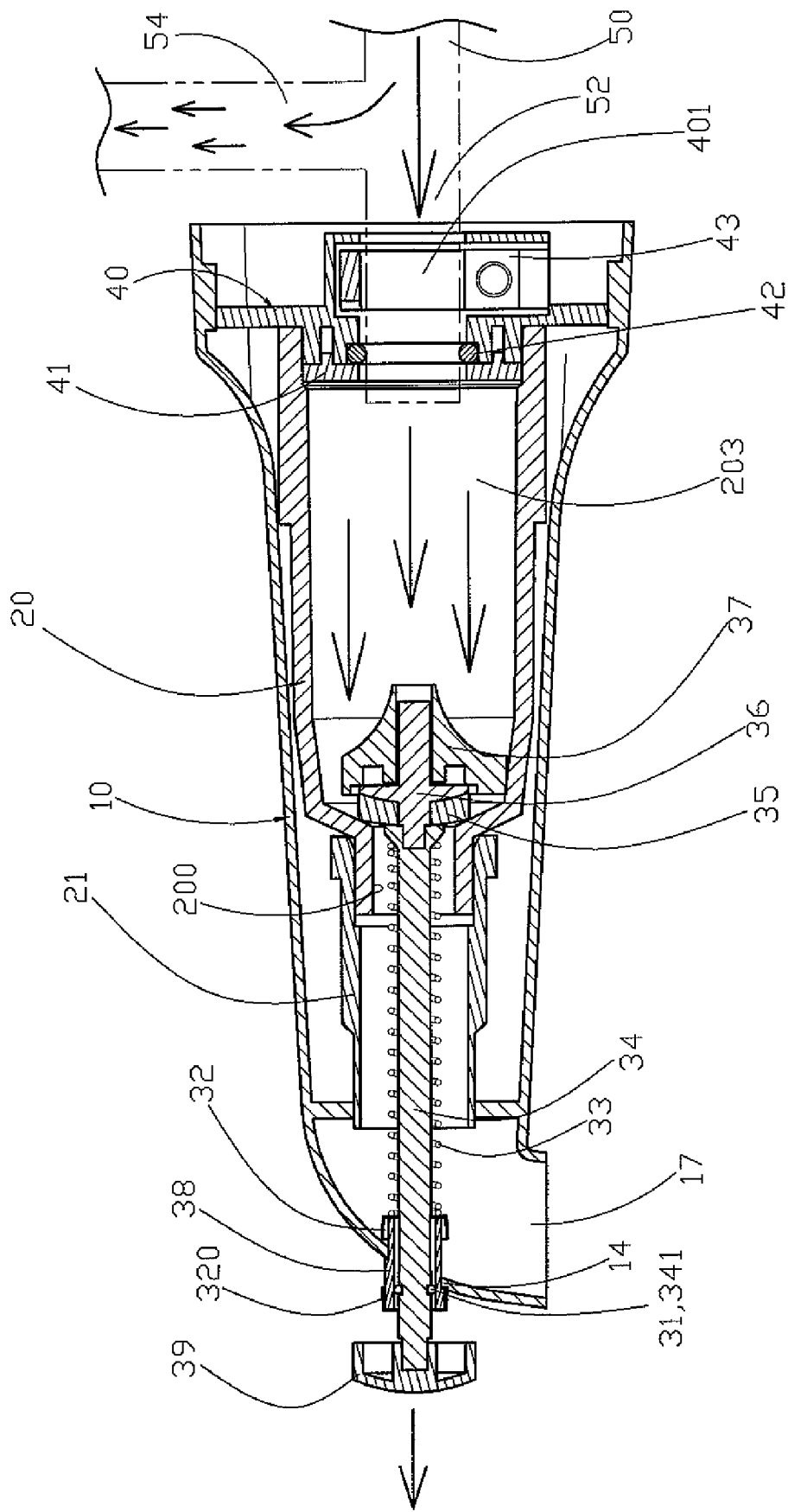
FIG. 7 is a schematic operational view of the faucet as shown in FIG. 6.

In operation, referring to FIGS. 6 and 7 with reference to FIGS. 1-5, the restoring member 33 of the control valve 30 pushes the stop gasket 35 of the control valve 30 to detach from the flow channel 200 of the sleeve 20 to connect the flow channel 200 of the sleeve 20 to the receiving chamber 203 of the sleeve 20 as shown in FIGS. 4 and 5. In such a manner, the water from the water pipe 50 in turn flows through the first water inlet 52 of the water pipe 50, the water inlet port 401 of the mounting seat 40, the receiving chamber 203 of the sleeve 20, the flow channel 200 of the sleeve 20, the extension sleeve 21 and the water outlet port 17 of the faucet body 10 as shown in FIG. 6 and flows outwardly from the water outlet port 17 of the faucet body 10 for use with a user. At this time, the sealing gasket 31, the leakproof gasket 38, the first leakproof cap 32 and the second leakproof cap 320 of the control valve 30 are tightly and closely located between the control shaft 34 of the control valve 30 and the through hole 14 of the faucet body 10 to seal the through hole 14 of the faucet body 10 so as to prevent the water from leaking from the through hole 14 of the faucet body 10 and to stabilize the water pressure in the faucet body 10.

On the contrary, when the control knob 39 of the control valve 30 is pulled outwardly relative to the faucet body 10, the control shaft 34 of the control valve 30 is movable relative to the faucet body 10 and the sleeve 20 to compress the restoring member 33 of the control valve 30 and to move the stop gasket 35 of the control valve 30 to seal the flow channel 200 of the sleeve 20 so as to interrupt the connection between the flow channel 200 of the sleeve 20 and the receiving chamber 203 of the sleeve 20 as shown in FIG. 7, so that the water from the water pipe 50 in turn flows through the second water inlet 54 of the water pipe 50 to the shower head of the faucet body 10 and flows outwardly from the shower head of the faucet body 10 for use with the user. At this time, the restoring member 33 of the control valve 30 is compressed by the water pressure in the receiving chamber 203 of the sleeve 20 so that the stop gasket 35 of the control valve 30 seals the flow channel 200 of the sleeve 20 closely.

In addition, when the water flow stops (or when the control knob 39 of the control valve 30 is pushed toward the faucet body 10), the stop gasket 35 of the control valve 30 is pushed by the restoring force of the restoring member 33 of the control valve 30 to detach from the flow channel 200 of the sleeve 20 to connect the flow channel 200 of the sleeve 20 to the receiving chamber 203 of the sleeve 20 as shown in FIGS. 4 and 5 so that the water flows outwardly from the water outlet port 17 of the faucet body 10 at a normal state.

Accordingly, the sealing gasket 31, the leakproof gasket 38, the first leakproof cap 32 and the second leakproof cap 320 of the control valve 30 are tightly and closely located between the control shaft 34 of the control valve 30 and the through hole 14 of the faucet body 10 to seal the through hole 14 of the faucet body 10 so as to prevent the water from leaking from the through hole 14 of the faucet body 10 and to stabilize the water pressure in the faucet body 10. In addition, when the water flow stops, the stop gasket 35 of the control valve 30 is pushed by the restoring force of the restoring member 33 of the control valve 30 to detach from the flow channel 200 of the sleeve 20 to connect the flow channel 200 of the sleeve 20 to the receiving chamber 203 of the sleeve 20 so that the water flows outwardly from the water outlet port 17 of the faucet body 10 at a normal state, thereby facilitating the user operating the faucet. Further, the control knob 39 of the control valve 30 is pushed by the restoring force of the restoring member 33 of the control valve 30 to return to the original state, thereby saving the user's energy.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A faucet, comprising a faucet body, a sleeve, and a control valve, wherein:
    the faucet body has a first end provided with a through hole and a water outlet port;
    the sleeve is mounted in a second end of the faucet body and has a first end provided with a flow channel connected to the through hole and the water outlet port of the faucet body and a second end provided with a receiving chamber connected to the flow channel;
    the control valve is mounted in the faucet body and the sleeve and includes:
    a control shaft movably mounted in the faucet body and the sleeve and having a first end extending through the through hole of the faucet body and a second end extending into the receiving chamber of the sleeve;
    a stop gasket secured on the second end of the control shaft to move with the control shaft and movable to seal the flow channel of the sleeve to interrupt a connection between the flow channel of the sleeve and the receiving chamber of the sleeve;
    a leakproof gasket secured in the through hole of the faucet body and encompassing the control shaft;
    a sealing gasket secured on the first end of the control shaft and located in the leakproof gasket;
    wherein the control valve further includes:
    a first leakproof cap mounted between the leakproof gasket and the control shaft and located in the faucet body;
    a second leakproof cap mounted between the leakproof gasket and the control shaft and located outside of the faucet body.

2. The faucet in accordance with claim 1, wherein the control valve further includes:
    a control knob mounted on the first end of the control shaft and located outside of the faucet body to move the control shaft and the stop gasket.

3. The faucet in accordance with claim 2, wherein
    the first end of the control shaft of the control valve is provided with an outer thread;
    the control knob of the control valve is provided with an inner thread screwed onto the outer thread of the control shaft.

4. The faucet in accordance with claim 1, wherein the control valve further includes:
    a restoring member mounted on the control shaft and biased between the faucet body and the stop gasket to move the stop gasket to detach from the flow channel of the sleeve to connect the flow channel of the sleeve to the receiving chamber of the sleeve.

5. The faucet in accordance with claim 4, wherein
    the second end of the control shaft of the control valve has an outer wall provided with an enlarged stop flange;
    the restoring member of the control valve is biased between the first leakproof cap and the stop flange of the control shaft.

6. The faucet in accordance with claim 1, wherein the control valve further includes:
    a retaining member combined with the second end of the control shaft and abutting the stop gasket to retain the stop gasket on the control shaft.

7. The faucet in accordance with claim 6, wherein the control valve further includes:
    a valve seat mounted on the retaining member to move with the retaining member.

8. The faucet in accordance with claim 6, wherein
    the second end of the control shaft of the control valve has an inner wall provided with an inner thread;
    the retaining member of the control valve is provided with a threaded rod extending through the stop gasket and screwed into the inner thread of the control shaft.

9. The faucet in accordance with claim 1, wherein the leakproof gasket of the control valve is located between the first leakproof cap and the second leakproof cap.

10. The faucet in accordance with claim 1, wherein
    the first leakproof cap of the control valve is enclosed around a first end face of the leakproof gasket and abuts a periphery of the control shaft;
    the second leakproof cap is enclosed around a second end face of the leakproof gasket and abuts the periphery of the control shaft.

11. The faucet in accordance with claim 1, wherein
    the first end of the control shaft of the control valve is movable in the leakproof gasket;
    the sealing gasket of the control valve is movable in the leakproof gasket.

12. The faucet in accordance with claim 1, wherein
    the first end of the control shaft of the control valve is provided with a retaining groove;
    the sealing gasket of the control valve is secured in, the retaining groove of the control shaft.

13. The faucet in accordance with claim 1, further comprising:
    a mounting seat mounted on the second end of the faucet body and combined with the second end of the sleeve.

14. The faucet in accordance with claim 1, wherein the sealing gasket, the leakproof gasket, the first leakproof cap and the second leakproof cap of the control valve are located between the control shaft of the control valve and the through hole of the faucet body to seal the through hole of the faucet body.

15. The faucet in accordance with claim 1, wherein the stop gasket of the control valve is made of rubber and has a ring shape.

16. A faucet, comprising a faucet body, a sleeve, and a control valve, wherein:

the faucet body has a first end provided with a through hole and a water outlet port;

the sleeve is mounted in a second end of the faucet body and has a first end provided with a flow channel connected to the through hole and the water outlet port of the faucet body and a second end provided with a receiving chamber connected to the flow channel;

the control valve is mounted in the faucet body and the sleeve and includes:

a control shaft movably mounted in the faucet body and the sleeve and having a first end extending through the through hole of the faucet body and a second end extending into the receiving chamber of the sleeve;

a stop gasket secured on the second end of the control shaft to move with the control shaft and movable to seal the flow channel of the sleeve to interrupt a connection between the flow channel of the sleeve and the receiving chamber of the sleeve;

a leakproof gasket secured in the through hole of the faucet body and encompassing the control shaft;

a sealing gasket secured on the first end of the control shaft and located in the leakproof gasket; wherein the first end of the sleeve is provided with a protruding mounting post;

the faucet further comprises an extension sleeve mounted in the faucet body and having a first end mounted on the mounting post of the sleeve and a second end connected to the through hole and the water outlet port of the faucet body.

17. The faucet in accordance with claim 16, wherein the control shaft of the control valve extends through the extension sleeve and the flow channel of the sleeve.

* * * * *